Figure 8:
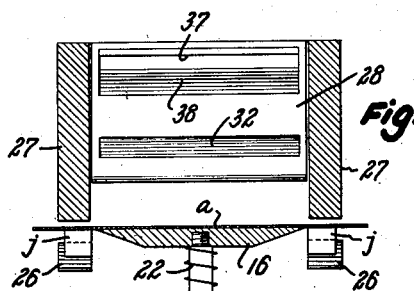

Aug. 12, 1958  R. J. HICKIN  2,846,929
METHOD OF ERECTING CARTONS
Filed June 13, 1955  5 Sheets-Sheet 1
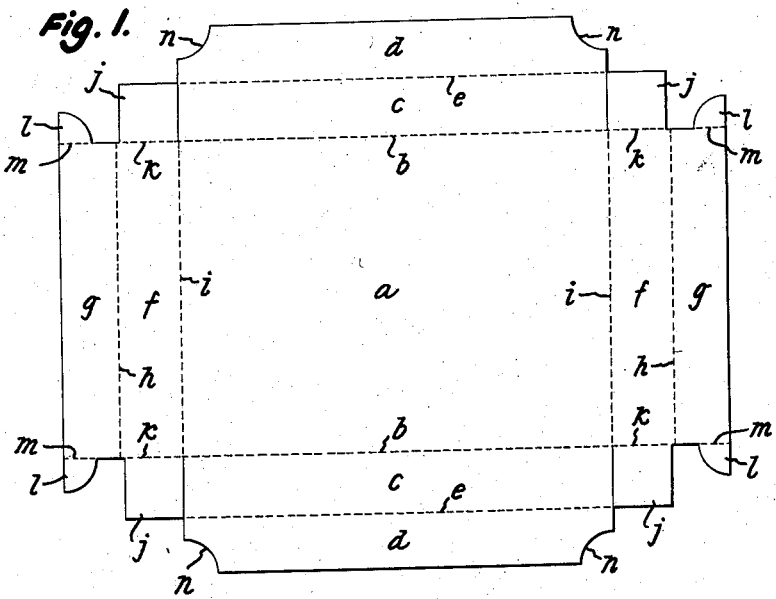
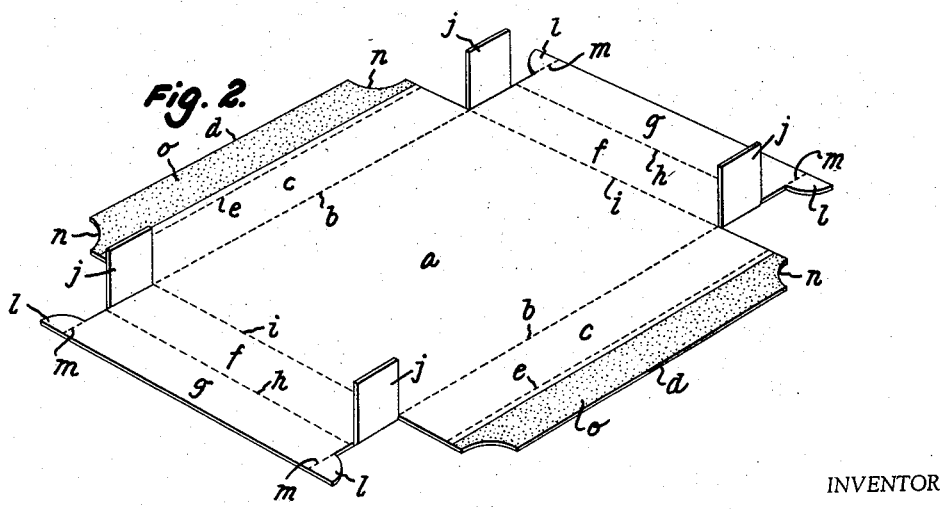
INVENTOR
Robert J. Hickin
BY
ATTORNEY

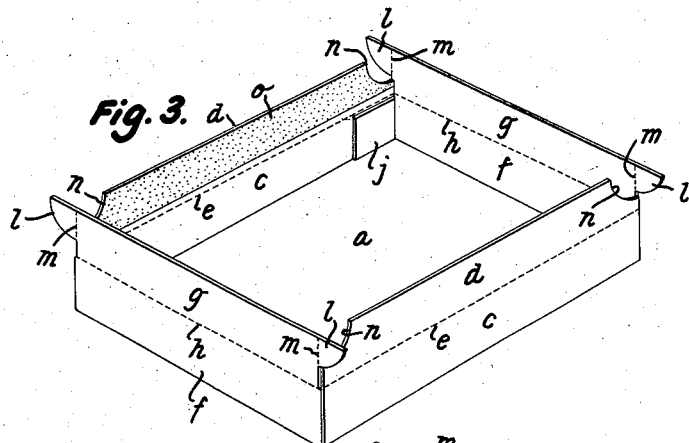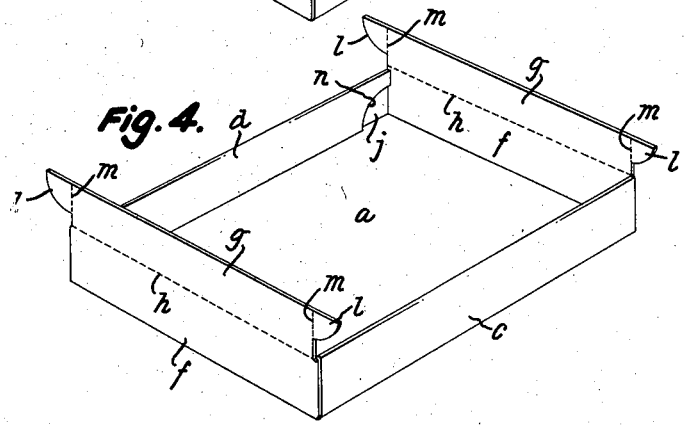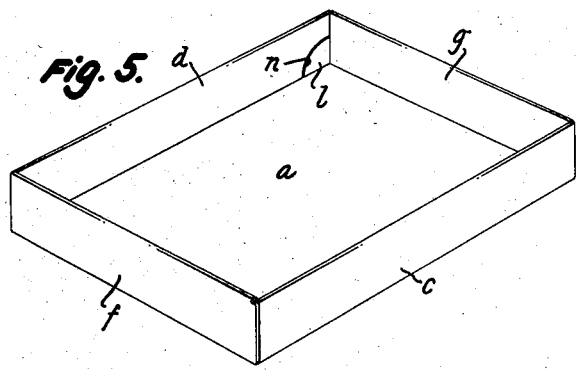

Aug. 12, 1958  R. J. HICKIN  2,846,929
METHOD OF ERECTING CARTONS
Filed June 13, 1955  5 Sheets-Sheet 3
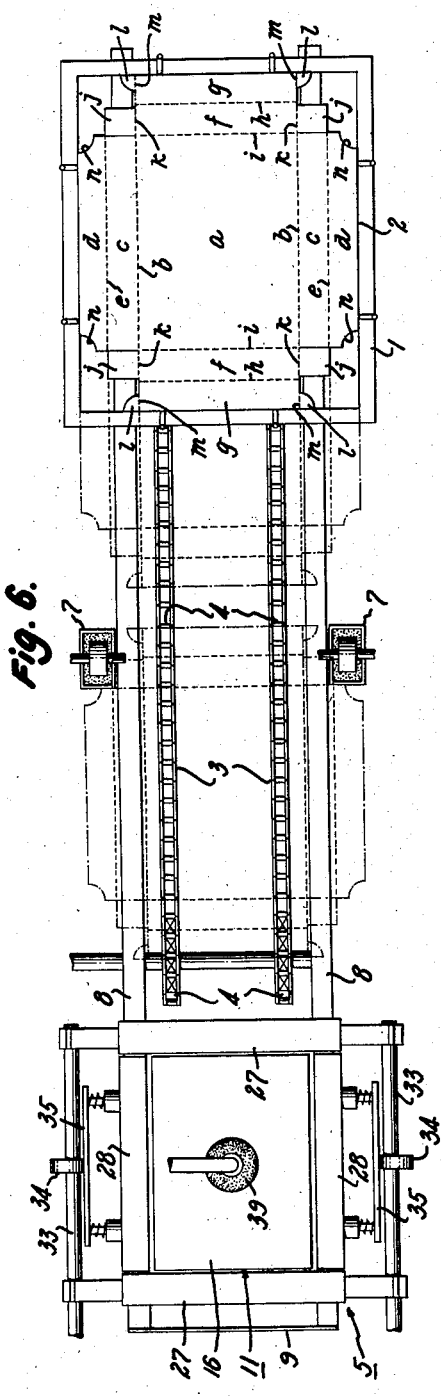
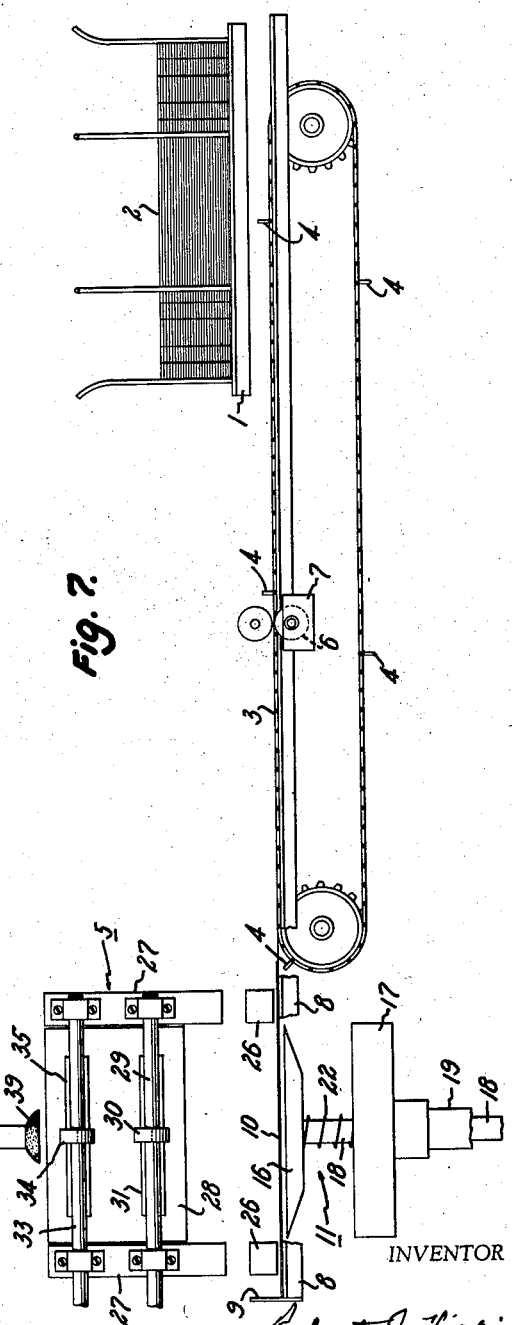
INVENTOR
Robert J. Hickin
BY
ATTORNEY Aug. 12, 1958  R. J. HICKIN  2,846,929

METHOD OF ERECTING CARTONS

Filed June 13, 1955  5 Sheets-Sheet 4

INVENTOR
Robert J. Hickin
by
ATTORNEY

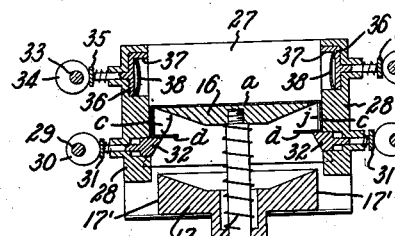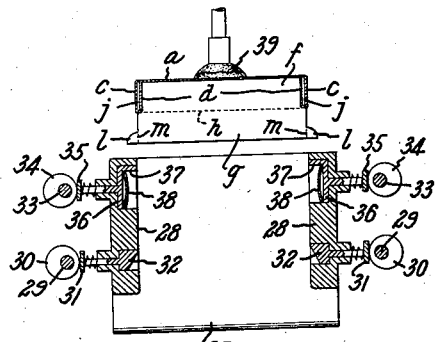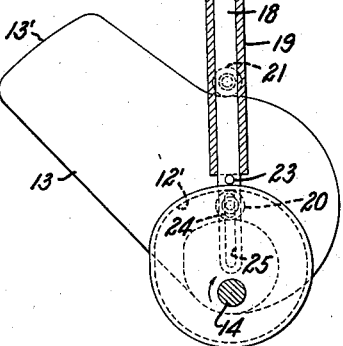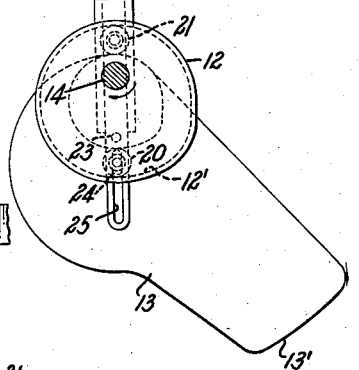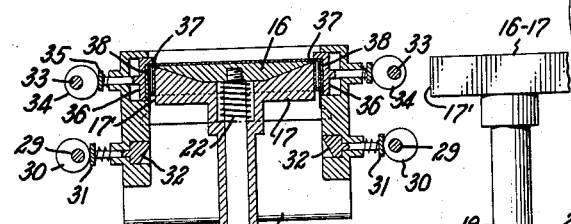

United States Patent Office 2,846,929
Patented Aug. 12, 1958

2,846,929

METHOD OF ERECTING CARTONS

Robert J. Hickin, Seville, Ohio, assignor to The Ohio Boxboard Company, Rittman, Ohio, a corporation of Ohio Application June 13, 1955, Serial No. 514,948

2 Claims. (Cl. 93—36)

This invention relates to paperboard cartons, particularly those of the so-called finished-edge or double-wall type, and it has to do primarily with a method of erecting the blanks for such cartons, especially where such blanks depart, particularly as regards the location and mode of assembly of their wall corner locking or securing flaps, from the now commonly accepted types of blanks for producing cartons of this general character.

In accordance with commonly accepted practice, the blank for a finished-edge or double-wall carton has two of its four opposite walls provided with corner locking or securing flaps which, when the blank is set up, are disposed against the other two opposite walls and lie between, and are held in assembled relation to, the two foldably disposed plies of these latter walls. In some instances these plies are glued together and the said corner locking or securing flaps are thus glued to and between the plies. In other instances the said plies are secured in their set up condition by snap-locking means.

The snap-lock securing practice is cheaper from the manufacturing standpoint, and is performed in the setting up operation with simpler steps than the gluing practice, but the resulting carton does not square up so readily and its corners are considerably less stable and rigid than where gluing is resorted to.

The blanks for many cartons of the double-wall type particularly referred to have the walls which bear the corner securing or locking flaps glued into their final two-ply form prior to the setting up operation and are furnished by the manufacturer to the customer in this condition. This gluing operation increases the manufacturer's production cost and concomitantly increases the price paid by the consumer. Moreover, blanks thus glued have a tendency to curl or warp, and this makes difficult proper handling of them by the erecting or setting-up mechanism.

In accordance with the practice of the present invention, particularly when employed in the erection of a carton blank having especially adapted structural features as will be pointed out, the undesirable characteristics of finished-edge double-wall cartons are avoided, more reliable erection procedures and resultant economies are attained, and stronger cartons more acceptable to the packager customer are produced.

Furthermore, in following the practice of the invention the operation of setting up or erecting the carton blanks can be conducted by mechanized steps which require for their performance apparatus which will occupy much less floor space than has heretofore been required for comparable operations, and which is much less expensive to acquire and operate. Also, due to the greater reliability of the setting up operations, the functioning of the setting up mechanism in their performance will be more dependable, scrapping or damaging of blanks will be reduced, and the desired carton output of the setting up machine insured. These advantages will result in a saving of expense not heretofore possible.

From the foregoing it will, it is thought, be obvious that the main object of the invention is to produce a carton of the so-called finished edge, double wall type comparable with, or better than, cartons of this type now known, but capable of more economical production with attendant savings to the user.

To this end the invention comprises a series or sequence of carton blank erecting steps performed upon an especially designed carton blank, whereby time consuming and uneconomical blank handling and erecting practice heretofore employed may be dispensed with, while at the same time providing an improved and more acceptable finished carton having, nevertheless, all of the characteristics required by the user and to which he has become accustomed and has accommodated his production facilities and operations, all as will be explained hereinafter more fully and finally claimed.

Figure 9:
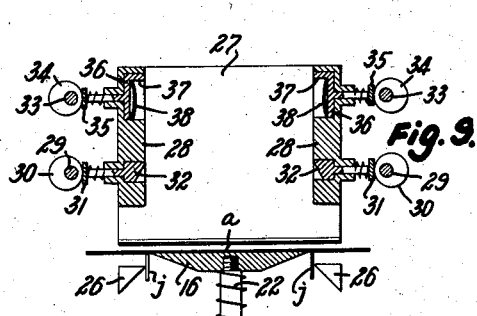
Figure 10:
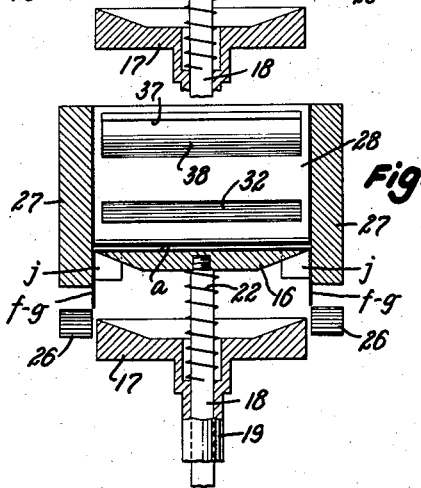
Figure 11:
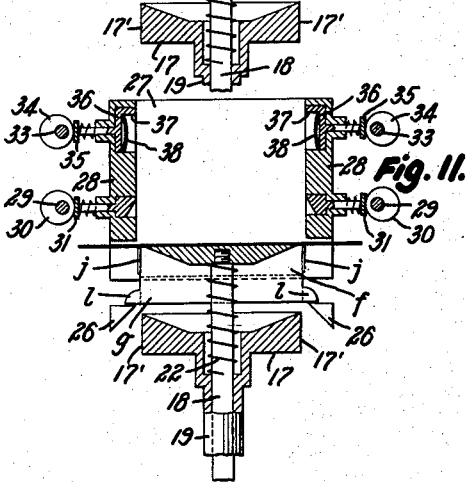
Figure 12:
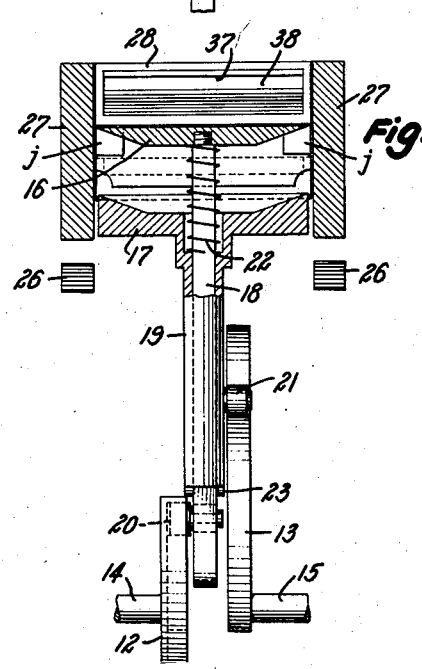
Figure 13:
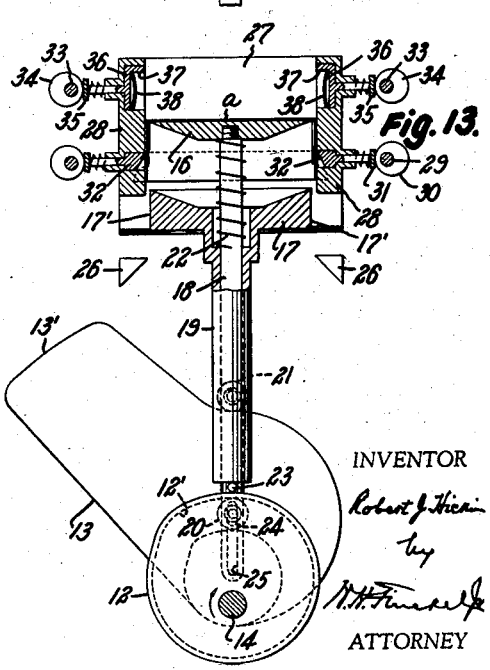

In the accompanying drawings illustrating the invention, in the several figures of which like parts are similarly designated, Fig. 1 is a plan view of the inner face of a blank for a carton answering the purposes of the method of the invention, Fig. 2 is a perspective view of the carton blank of Fig. 1 after performance thereon of the first two steps of the method of the invention, Fig. 3 is a view similar to Fig. 2, but showing the parts of the blank in the positions to which they are erected following two further steps of the method of the invention, Fig. 4 shows, in perspective, the arrangement of the parts of the blank following a further erection step, Fig. 5 shows, in perspective, the association and arrangement of the carton parts after completion of the erection steps of the method of the invention, Fig. 6 is a top plan view schematically illustrating an association of mechanisms which might be effectively employed in performing essential steps of the method of the invention, Fig. 7 is a side elevation of the mechanisms shown in Fig. 6, Figs 8 and 9 are, respectively, fragmentary central longitudinal and transverse sectional elevations illustrating the performance of the first step of the erecting operation to which the carton blank is subjected at the forming station of the mechanism in accordance with the method of the invention, Figs. 10 and 11 are views similar to Fig. 8 and 9 but illustrating the performance of the second step of the erecting operation, Figs. 12 and 13 are views similar to Figs. 8 and 10, and 9 and 11, respectively, but including the plunger actuating mechanism, and showing the performance of the third step of the erecting operation, Fig. 14 is a view similar to Fig. 13 but illustrating the performance of the fourth erecting step, Fig. 15 is a view similar to Figs. 13 and 14 but showing the completion of the erecting steps performed by the mechanism illustrated, Fig. 16 is a fragmentary side elevation of the plunger and its actuating mechanism as shown in Fig. 15, and Fig. 17 is a view similar to Figs. 13 to 15 but showing a nearly fully erected carton discharged from the forming station and the mechanism restored to position to commence its cycle of operative steps upon another properly fed and treated carton blank in registered position.

It will be understood that the nature and assembly of the mechanisms shown in Figs. 6 to 17 is illustrative only of such as might be suitable for carrying out desired steps of the method of the invention and that such method may be, and conceivably is, capable of performance by other types and arrangements of mechanisms.

Furthermore, in the following description of the carton blank and carton shown in Figs. 1 to 5, and in the claims, the designation of the respective pairs of wall members as side walls and end walls is followed for convenience in descriptive identification rather than as limiting attachment of cooperative parts to either pair of walls.

In the carton, Figs. 1 to 5, which is particularly disclosed and claimed in applicant's copending application for patent for Carton, filed June 27, 1955, Serial No. 518,230, and which is particularly adapted for erection in accordance with the method of the present invention, it will be seen that the blank, Fig. 1, from which the carton is formed, comprises a sheet of appropriate paperboard cut and scored to provide a bottom $a$ to which are joined upon folding scores $b$ the side walls comprising outer plies $c$ and inner plies $d$ defined from each other by folding scores $e$ which, when the blank is fully erected, provide the finished edges of the side walls. End walls comprising outer plies $f$ and inner plies $g$ defined from each other by the finished-edge forming folding scores $h$, are joined to the bottom by folding scores $i$. The lateral edges of the outer plies $f$ of the end walls are provided with corner-securing or locking flaps $j$ bendable inwardly at right angles to their said outer plies $f$ upon folding scores $k$, and the inner plies $g$ are provided with locking tabs $l$ bendable upon folding scores $m$ and serving, when the carton is erected, to engage locking recesses formed at the corners of the inner plies $d$ of the side walls by cut-outs $n$.

It will be noted that this carton blank is not materially different, insofar as its essential elements are concerned, from the blanks of known cartons of this general double-wall finished-edge type, but the arrangement and mode of association of its elements in the erected carton are entirely different from those of any carton now known, so far as applicant is aware, and serve to produce a carton having practical characteristics of strength and reliability in erection, as hereinbefore indicated, and as hereinafter more particularly described, which tend to make it more acceptable to customers from the standpoint of enhanced utility and economy.

These advantages are attained by virtue of the fact that the corner locking flaps are embraced between the outer and inner plies $c$ and $d$ of the side walls and are adhesively secured to the inner plies $d$ thereof which are adhesively secured to the outer plies $c$, and this is a radical departure from the erected association of the elements of lock-end finished-edge double-wall cartons now known, in that in such prior cartons there is either no adhesive uniting of the side wall plies between which the corner locking flaps are embraced, or the corner locking flaps are formed upon the ends of the outer plies of the side walls and are interposed between the inner and outer plies of the lock-end end walls and are thus relatively insecurely frictionally retained by the mere snap-locking of the inner plies of such end walls.

In other words, applicant is not aware of, and the prior art appears not to show, any example of a lock-end finished-edge double-wall carton in which the corner securing or locking flaps are formed as parts of the lock-end elements and are adhesively secured between the plies of the side walls during the operation of erecting the carton blank to finished form.

Having reference to Figs. 2 to 5, it will be seen that, in accordance with the preferred erecting method of the invention, the following steps are performed in the sequence now given. Stripes of adhesive $o$ are applied to the inner surfaces of the inner plies $d$ of the side walls, and then the corner locking flaps $j$ are folded upon their scores $k$ to position substantially at right angles to their respective outer plies $f$ of the end walls, Fig. 2. Then the end walls are folded upon their scores $i$ to position substantially at right angles to the bottom $a$ thus causing the corner locking flaps $j$ to be rotated with the plies $f$ through an angle of 90° and thus be arranged with their edges against the bottom $a$, whereafter the side walls are folded upon their scores $b$ to position substantially at right angles to the bottom $a$, which brings the inner surfaces of their outer plies $c$ in juxtaposition to the adjacent surfaces of the locking flaps $j$, Fig. 3. Then the inner plies $d$ are folded inwardly upon their scores $e$ and over the corner locking flaps $j$ so that the already-applied stripes of adhesive $o$ will cause them to adhere to the corner locking flaps $j$ and to the outer plies $c$ and they are retained thus in adhesive engagement for a time sufficient for the adhesive to set adequately to permit further erecting handling of the thus partially set up carton without danger of its parts becoming dissociated, Fig. 4. Thereafter, the inner plies $g$ of the end walls are folded inwardly upon their folding scores $h$ and their locking tabs $l$ lockingly engaged with the recesses provided by the cut-outs $n$ of the inner plies $d$ of the side walls, Fig. 5, thus completing the erection of the carton.

Although, as hereinbefore stated, it is conceivable that various forms of apparatus, including a variety of assemblies of mechanisms, could be provided for carrying out the steps of the method of the invention, the form and assembly of mechanisms illustrated schematically in Figs. 6 to 17 is representative as adequate.

As illustrated in this showing of apparatus, a holder or hopper 1 is provided for a plurality of the carton blanks uniformly arranged in a stack 2 and so disposed as to present their side walls $c$—$d$ longitudinally of conveyor means such as the chains 3 provided with appropriately spaced feed lugs 4 and to which the blanks may be serially fed by a picker means, or the like feeder, not shown, from the bottom of the stack 2.

As the blanks are successively fed, inner face down, by the conveyor chains 3 toward a forming station 5, as indicated by the broken outlines, the inner faces of the inner plies $d$ of their side walls will pass over, and in operative contact with, the glue wheels 6 of underneath gluers 7 and will receive therefrom the desired stripes of adhesive $o$. During their advance with the conveyor the blanks will be supported by rails 8 and will, in appropriately timed succession, be brought into operative register at the forming station 5 by a stop 9 and proper side edge guides, not shown, so that they may be in proper position for operation upon them by the erecting mechanisms of the forming station. In Fig. 7 a blank is shown at 10 thus registered and supported by the guides 8.

As shown in Figs. 7 and 17, the forming plunger means 11 are in retracted, inoperative, position just below the registered blank 10, and are thus retained by the face cam 12 and peripheral cam 13 which are supported and synchronously driven on shafts 14 and 15, respectively, by appropriate power means, not shown, in timed relation to the feeding advance of the conveyor chains 3, so that prior to each upward stroke of the plunger means 11 a blank will be in a position of register at the forming station.

It will be noted that the plunger means 11 is of two-part construction comprising an inner head 16 and an outer head 17. The inner head 16 is mounted upon a shaft 18 vertically slidable in and relatively to a sleeve 19 which carries the outer head 17 and, as will be apparent, vertical and relative movement is imparted to the shaft 18 and sleeve 19, and to the heads 16 and 17 mounted thereon, through cam follower rollers 20 and 21 carried by the said shaft and sleeve, respectively, and cooperating with the cams 12 and 13, respectively. A spring 22 interposed between the two heads serves normally to maintain them in spaced relation, as shown in Figs. 8 to 15 and 17, and a stop pin 23 carried by the shaft 18 serves to limit this said separation to the desired amount by contacting the end of the sleeve 19. In order that the two heads of the plunger may move together as a unitary head, when necessary during the carton erecting operation, as shown in Fig. 15, the cam follower roller 20 of the shaft 18 is mounted upon a slide block 24 movable in a slot 25 in the shaft 18 but normally contacting the upper end of such slot, as shown in Figs. 13, 14 and 17. Obviously, the weight of the plunger mechanism will cause its proper descent and serve to maintain the slide block 24 and its roller 20 at the upper end of the slot 25 as the roller 20 follows the contour of the rotating cam 12, but spring means, not shown, may be attached to the lower end of the shaft 18 for this purpose if found desirable.

Other parts and mechanisms of the apparatus, and their functioning in relation to the reciprocation of the plunger heads 16 and 17 will, it is thought, be best understood in describing the steps they perform in the method of erecting the successively registered carton blanks.

As the plunger head 16 ascends in response to rotation of the face cam 12 from the position of Figs. 7 and 17 to that of Figs. 8 and 9, the carton blank will have been elevated, with the plunger head 16 supporting the area of the bottom a of the blank, so that the corner securing or locking flaps j will have been wiped against the four fixed angular-faced abutments 26 and folded downwardly upon their folding scores k substantially at right angles to the plane of the blank bottom a.

Upon continued ascent of the plunger head 16, Figs. 10 and 11, the end walls f—g of the blank will wipe against the lower edges of fixed forming plates 27 and be folded downwardly upon the folding scores i at right angles to the plane of the blank bottom a so that the corner locking flaps j are rotated, edgewise, through an angle of 90° along with the end walls.

As the plunger head 16 rises still further, Figs. 12 and 13, the side walls c—d will wipe against the edges of other fixed forming plates 28 which, with the forming plates 27, define the forming cavity, and will be folded downwardly upon the folding scores b at right angles to the plane of the carton blank bottom a.

Now, while the roller 20 which actuates the shaft 18 and head 16 is travelling in the short concentric portion 12' of the cam 12, and the carton blank thus far erected is held stationary, the shafts 29, carrying the cams 30 will be oscillated, or rotated, through an angle of 180°, Fig. 14, through appropriate mechanism, not shown, timed in its operation to the reciprocative movement of the plunger head 16, and these cams 30 acting against follower plates 31 will cause spring-returned folder bars 32 to move inwardly of the plates 28 and inwardly fold the inner plies d of the side walls upon their folding scores e substantially at right angles to their outer plies c.

During the folding operation of the folder bars 32 the cam 13 will begin to function to elevate the outer plunger head 17, the inner plunger head 16 meanwhile being held against movement, and upon completion of this folding operation, and retraction of the folder bars 32, the upper edges of the head 17 will engage and upwardly fold the inner plies d of the side walls, and its side faces 17' will hold them thus folded against the corner locking flaps j and the outer plies c of the side walls during continued rise of the now combined plunger heads 16 and 17 to the position shown in Fig. 15.

It will be understood that the carton erecting steps thus far described are performed in such rapid sequence following application of the glue stripes o that the glue is still adhesively tacky, and hence upon completion of the last-described erecting step the glue will cause the inner and outer plies c and d of the side walls and the corner locking flaps j embraced by them all to stick together, as shown in Fig. 4.

When the combined plunger head 16—17 thus carrying the partially erected carton rises to the position shown in Fig. 15, the concentric portion 13' of the peripheral cam 13 will hold it in this position while cam shafts 33 carrying cams 34 are oscillated, or rotated, through an angle of 180° to cause the cams 34 bearing against follower plates 35 to move spring-returned combined stop and pressure bars 36 inwardly of the former plates 28 so that their stops lips 37 will arrestingly engage the opposite edges of the carton bottom a and their pressure-applying faces 38, which are preferably resilient, reacting with the side faces 17' of the head 17, will apply pressure to the assembled side walls and corner locking flaps and hold them under such pressure for a time sufficient for the glue to take, at least, its initial set, to thereby condition the thus-far erected carton for further automatic handling.

It will be understood that the cam shafts 33 are actuated in a manner similar to that of the cam shafts 29 so that the pressure bars 36 are properly operated in timed relation to the movement and dwell of the combined plunger head 16—17.

Thereafter, the thus-far erected carton may be removed from the forming cavity as by a suction picker device 39 and moved, or removed, thereby, or otherwise, to mechanism for performing the in-folding and snap-locking of the inner plies g of the end walls to thereby complete the erection or assembly of the carton as shown in Fig. 5. There is quite a choice of mechanisms for this purpose, and representative examples are disclosed in the patents of Johnson No. 1,287,032, December 10, 1918, Joslin No. 1,814,043, July 14, 1931, Knowlton No. 2,042,472, June 2, 1936, Mednick No. 2,132,859, October 11, 1938, and Straw et al. No. 2,232,932, February 25, 1941, or in the copending application of Edwin J. Plough and Gerald H. Steele for patent for Carton Machine, filed April 14, 1954, Serial No. 423,066, now Patent No. 2,820,403, granted January 21, 1958.

Of course, after its completion of the erecting steps, the plunger 11 (16—17) is retracted to its starting position, Figs. 7 and 17.

In the foregoing description of the practice of the method of the invention the mechanically performed steps are described in relation to carton blanks which are arranged in the feeder stack 2 with their outer (usually decoratively printed) surfaces upward. It will be readily understood, however, that the practice of the invention is not thus limited, as it might equally readily be performed upon carton blanks presented in reverse arrangement (outer surface downward in stack 2), in which case overhead gluers would be substituted for the underneath gluers 7, and the direction of operative reciprocation of the plunger, and the arrangement of its cooperating forming cavity parts, would be reversed end-for-end axially of the shaft 18.

Furthermore, although the sequence of the erecting steps of the method of the invention as hereinbefore given is believed to be preferred from a practical standpoint, it is conceivable that changes in such sequence might be made, particularly in the preliminary steps, without departing from the basic concept of the invention.

Also, although the invention is directed primarily to the erection of cartons of the lock-end, finished-edge, double wall form, it will be apparent that it is equally well adapted to the erection of cartons in which the end walls are of single ply construction but are provided with corner locking flaps engaged between, and adhesively secured in embraced relation with, the two plies of the side walls.

Hence, various changes and modifications are considered to be within the principle of the invention and the scope of the following claims.

What I claim is:

1. The method of erecting the blank of a carton having a bottom, side walls foldably connected with the bottom and formed of outer and inner plies relatively foldable into juxtaposition, and end walls foldably connected with the bottom and formed of outer and inner plies relatively foldable into juxtaposition and provided at the lateral edges of their outer plies with foldable corner locking flaps to be engaged between and adhesively secured to the two plies of the side walls; comprising the steps of successively feeding such blanks to a forming station with their bottom and multiple side and end wall forming elements all in non-folded flat-blank condition and in the plane constituted by the single thickness of the blank, while the blanks are in such feeding travel applying adhesive to the faces of the inner plies of said side walls which lie, when folded, in juxtaposition to said outer plies, at said forming station folding said corner locking flaps inwardly substantially normal to said end walls, folding said end walls substantially normal to said bottom to thereby rotate said corner locking flaps through an angle of substantially 90°, folding said side walls substantially normal to said bottom and in juxtaposition to the previously folded and rotated corner flaps, folding the adhesive furnished inner plies of the side walls against and with their adhesive bearing surfaces in juxtaposition to said corner locking flaps and the inner surfaces of the outer plies of the side walls, and thereafter folding the inner plies of said end walls into juxtaposition to their outer plies.

2. The method of erecting the blank of a carton having a bottom, side walls foldably connected with the bottom and formed of outer and inner plies relatively foldable into juxtaposition, and end walls foldably connected with the bottom and formed of outer and inner plies relatively foldable into juxtaposition and provided at the lateral edges of their outer plies with foldable corner locking flaps to be engaged between and adhesively secured to the two plies of the side walls, and the inner plies of said side and end walls being provided with relatively engageable complemental locking means for ultimately retaining the inner plies of the end walls in set-up condition; comprising the steps of successively feeding such blanks in flat form with their bottom and multiple side and end wall forming elements all in the same plane to a forming station, while in such feeding travel applying adhesive to the faces of the inner plies of said side walls which lie, when folded, in juxtaposition to said outer plies, at said forming station folding said corner locking flaps inwardly substantially normal to said end walls, folding said end walls substantially normal to said bottom to thereby rotate said corner locking flaps through an angle of substantially 90°, folding said side walls substantially normal to said bottom and in juxtaposition to the previously folded and rotated corner flaps, folding the adhesive furnished inner plies of the side walls against and with their adhesive bearing surfaces in juxtaposition to said corner locking flaps and the inner surfaces of the outer plies of the side walls, and thereafter folding the inner plies of said end walls into juxtaposition to their outer plies and simultaneously with such folding effecting engagement of the complemental locking means of said inner side and end wall plies.

References Cited in the file of this patent

UNITED STATES PATENTS

| 1,724,529 | Stokes | Aug. 13, 1929 |
| 2,056,094 | Claff | Sept. 29, 1936 |
| 2,120,214 | Gregoire | June 7, 1938 |
| 2,132,859 | Mednick et al. | Oct. 11, 1938 |
| 2,371,046 | Gregoire | Mar. 6, 1945 |
| 2,469,641 | Goss | May 10, 1949 |
| 2,727,444 | Wethe | Dec. 20, 1955 |